April 9, 1946.  S. R. KASSOUF  2,398,229

FLUID PRESSURE OPERATED SERVO-MOTOR

Filed Aug. 16, 1943

INVENTOR.
Samuel R. Kassouf
BY Harry R. Canfield
ATTORNEY

Patented Apr. 9, 1946

2,398,229

UNITED STATES PATENT OFFICE 2,398,229

FLUID PRESSURE OPERATED SERVO-MOTOR

Samuel R. Kassouf, Cleveland, Ohio

Application August 16, 1943, Serial No. 498,815

8 Claims. (Cl. 121—129)

This invention relates to servo-motors operable by fluid under pressure, and particularly to such servo-motors that deliver oscillatory or reciprocatory power.

The invention may be embodied in various structures and the principles thereof may be applied to various uses; but in order to disclose an embodiment of the invention in accordance with the statutes, I have chosen to illustrate and describe herein an embodiment of the invention in which the power output element is a rotatably supported, oscillatable shaft, from which power may be taken to drive or operate various types of loads, illustrative of which loads are reciprocatory wind-shield wiper mechanisms.

The particular embodiment of the invention herein described comprises generally a unitary structure including a rotary or oscillatable power delivery shaft; a fluid pressure operated reciprocable piston for oscillating the shaft; an automatic valve for effecting reciprocation of the piston by fluid pressure supplied to the structure from an outside source; and various instrumentalities for coordinating and controlling the action of these parts; the true scope and definition of the invention, however, being set forth in the the appended claims.

It is among the objects of the invention:

To provide generally an improved servo-motor of the class referred to;

To provide, in a servo-motor of the fluid pressure operable class, improved means for effecting and controlling reciprocation or oscillation of a power delivery element;

To provide improved valve means for a servo-motor of the class referred to;

To provide reciprocable valve means for a fluid pressure servo-motor having an improved snap-action movement;

To provide, in a fluid pressure servo-motor having reciprocable parts, improved shock absorbing means for such parts;

To provide in a fluid pressure servo-motor having a reciprocable valve, improved means for applying fluid pressure power to operate the valve;

To provide, in a fluid pressure servo-motor having an oscillatable power delivering element, improved means for applying fluid pressure power to operate the power delivery element;

To provide, in a fluid pressure servo-motor having an oscillatory or reciprocatory power delivery element, improved means for adjustably changing the angle or length of stroke of the oscillations or reciprocations;

Other objects will be apparent to those skilled in the art to which my invention appertains.

My invention is fully disclosed in the following description taken in connection with the accompanying drawing in which.

Figure 1:
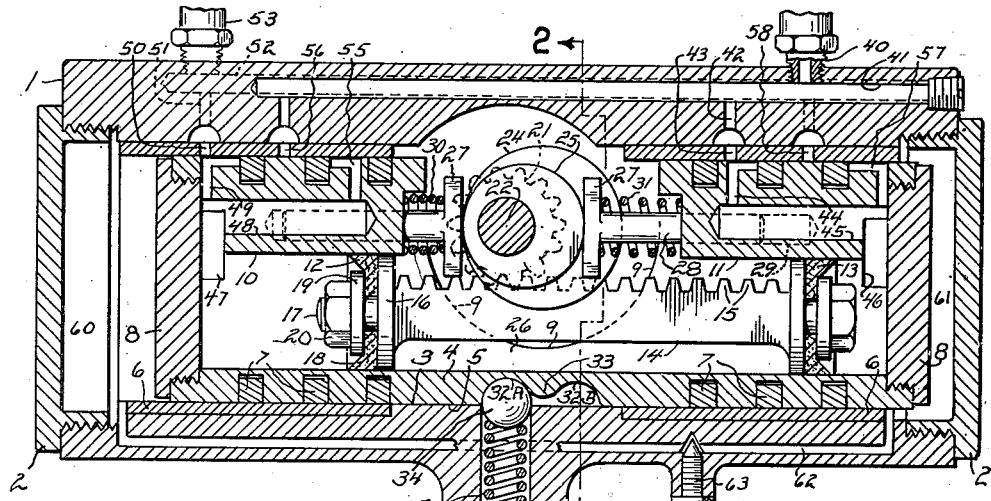
Fig. 1 is a longitudinal sectional view of an embodiment of my invention; and the view may be considered as taken from the plane 1—1 of Fig. 2.
Figure 2:
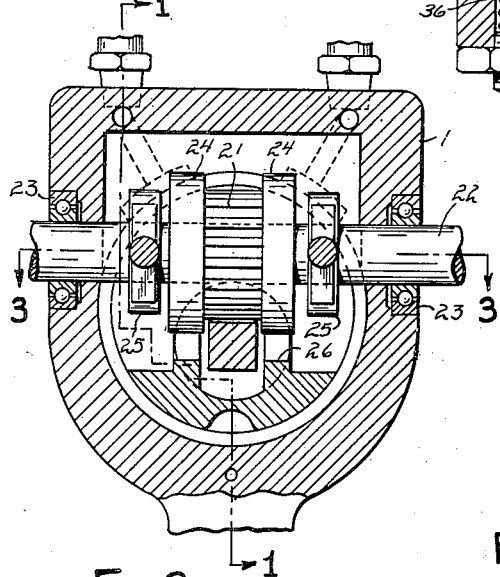
Fig. 2 is a cross-sectional view taken from the plane 2—2 of Fig. 1.
Figure 3:
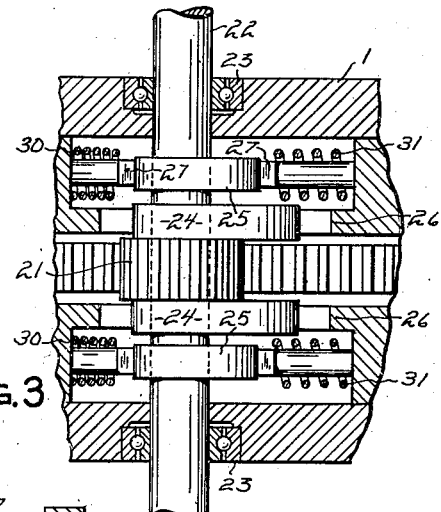
Fig. 3 is a cross-sectional view taken from the plane 3—3 of Fig. 2.
Figures 4, 5:
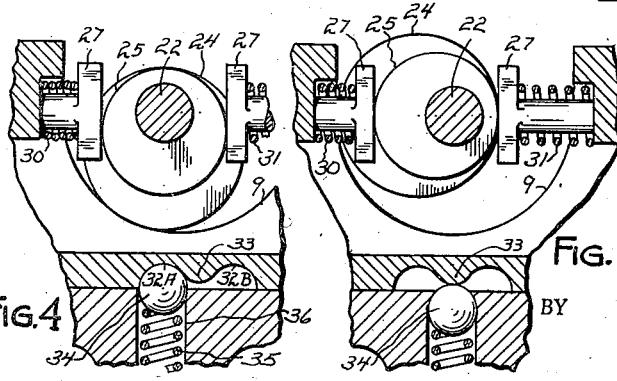
Figure 6:
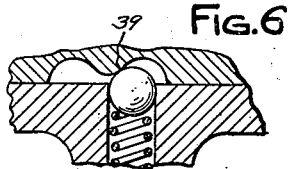

Figs. 4, 5, and 6 are fragmentary views of a part of Fig. 1 with parts thereof in different operative positions from the positions of Fig. 1.

Referring to the drawing I have shown at 1 a housing, supporting and enclosing the operative parts of the mechanism in a unitary manner, the housing being in general of elongated hollow or tubular form, and with the opposite ends closed and sealed by heads or plugs 2—2 screw-threaded thereinto.

The housing has a cylindrical bore 3 therein in which is reciprocably fitted a valve 4 the exterior surface 5 of which is generally cylindrical. The bore 3 is preferably lined with tubular bearing liners 6—6 and the valve is provided preferably with a plurality of piston-type sealing rings 7—7.

The valve 4 will thus be seen to be of the piston valve type and to be reciprocable longitudinally of the housing; and by means of the rings 7 and the liners 6 (which latter may be of specially chosen material), the valve will be sealed in its bore for purposes that will appear and will maintain the seal over a long period of wear resisting use.

The cylindrical valve 4 is itself longitudinally hollow or tubular, and contains, therewithin, parts of a mechanism, and its ends are sealedly closed by heads or plugs 8—8 threadedly screwed thereinto.

The upper side of the valve is cut away to provide a transverse opening therethrough, the contour of which is shown by the lines 9—9—9, to provide clearance for transverse parts of the mechanism.

In opposite end portions of the valve 4 are formed cylinders 10 and 11 in which are reciprocably supported pistons 12 and 13 connected by a longitudinally extending rack bar 14 having rack teeth 15 on its upper side.

These pistons may be of any suitable construction, and may be alike. The piston 12 as shown, comprises a head 16 on the rack bar 14, substantially fitting the cylinder 10, a shank 17 extending from the head 16, a cup washer 18 surrounding the shank, a metal washer 19 on the cup washer, and a nut 20 clamping the parts together in a well known manner. The construction of the piston 13 may be the same as that just described for the piston 12.

The rack teeth 15 mesh with the teeth on a pinion 21 secured in any suitable manner upon a shaft 22 extending transversely of the housing through the above mentioned opening 9—9 in the valve, and supported in bearings, preferably ball bearings 23—23 in the side walls of the housing; and when, in a manner to be described, the rack 15 is reciprocated, by fluid pressure alternately applied against the pistons 12 and 13, the pinion 21 is oscillated and in turn oscillates the shaft 22; and the shaft 22 thus is the power output shaft of the device.

Upon the shaft 22 is also mounted and secured, a pair of large cams 24—24, and a pair of small cams 25—25, one of each disposed on opposite sides of the pinion 21, for symmetry and balance purposes, and these cams function to reciprocate the valve 4 in response to oscillatory movement of the shaft 22 referred to. The rack bar 14 is shown in its extreme right hand position in Fig. 1 and when it is returned (by means to be described) the rack teeth 15 engaged with the pinion 21 will rotate the shaft 22 and the cams clockwise and the parts will successively take up the positions shown in Figs. 1, 4, 5, and 6.

The aforesaid opening 9—9 through the valve, is provided, in portions thereof opposite the cams 24—24, with ribs 26—26 and as the cams 24 rotate clockwise as referred to, they come into the position of Fig. 4 at which the cams engage the said ribs; and during continued clockwise movement of the cams 24, they camingly propel the valve 4 bodily toward the left.

The above mentioned cams 25—25 engages, at their peripheries, the T-heads of T-headed cam followers 27—27 and the stems 28—28, of which are reciprocably supported in bores 29 in the valves; and the T-heads of which are pressed outwardly toward and into engagement with the cams 25 by springs 30—30 (at the left of the cams) and 31—31 (at the right of the cams), surrounding the stems and abutting upon the heads and upon adjacent portions of the valve. These T-form cam followers and springs may be alike on each side of each cam 25.

When the valve is in an extreme position as shown for example in Fig. 1, the springs 30 are compressed to a greater degree than the springs 31. As the shaft 22 turns and rotates the cam 24—24 as described, it also rotates the cams 25—25; and going from Fig. 1 to Fig. 5 the springs 30—30 are compressed still farther.

As was shown above, the large cams 24—24 exert a positive camming action force on the valve to move it; and as just described the cams 25—25 exert an accumulated spring pressure, or force of stored spring energy, tending to move it.

Movement of the valve by these forces is yieldingly opposed until, as they increase, they overcome the yielding opposition, and the valve is then suddenly reciprocated to the other extreme longitudinal position. This yieldable opposing means will now be described.

In the lower side of the valve as viewed in the drawing, is a pair of longitudinally spaced recesses 32A and 32B and between them a downwardly projecting protuberance 33, the surfaces of the recesses and of the protuberance merging into each other smoothly. A steel ball 34 is spring-pressed toward the recesses by a helical compression ball-spring 35 disposed in a bore 36 in the housing, the tension of the spring being adjustable by a stud 37 threaded into the lower end of the bore 36, and the adjustment being fixed by a lock nut 38 on the stud. The ball 34 is illustrated in Fig. 1 as being depressed into the recess 32A.

When the valve starts to move toward the left as viewed in the drawing and as described above, the protuberance 33 will be forced against the ball 34, and the ball will be pushed down into the bore 36 against the tension of the spring 35. As the protuberance passes the ball, the ball will ride down over the other side of the protuberance (for example on that portion of its surface indicated by the reference character 39, in Fig. 6). The spring 35, acting through the ball, will give a quick impulse of force to the valve to tend to move it toward the left. At its final position, the ball 34 will be fully seated in the recess 32B.

The lower part of the ball 34 is trapped in the bore 36 so that it cannot move transversely; and at all times one or the other of the recesses 32A or 32B embraces the upper part of the ball, whereby the valve is prevented by the ball from rotating on its longitudinal axis for operative purposes that will become apparent. The ball by its engagement with the recesses, stops the movement of the valve in each direction.

The joint functions of the parts above described may now be stated.

The valve starts from the extreme right hand longitudinal position illustrated in Fig. 1 and is thrown over to a like extreme position at the left end of the housing, with a quick or snap type of movement, and repeats reciprocatively, the valve movements being effected by oscillations of the power delivery shaft.

The valve is stopped in its extreme position of Fig. 1 and held there by the ball 34 in the recess 32A, against the tendency of the springs 30—30 to move it. The shaft 22 begins to turn and the cams 24—24 (see Fig. 4) start to move the valve; and the protuberance 33 on the valve starts to depress the ball, and the ball starts to climb out of the recess 32A toward the center of the protuberance 33. During this time, the engagement of the ball 34 with the side wall of the recess 32A and protuberance 33, opposes movement of the valve. A point is reached in the movement of the valve by the cams, at which the spring pressed ball 34 is no longer able to hold the valve against the force of the springs 30—30; and then the valve is suddenly moved toward the left thereby, aided by the camming action of the ball 34 as it rides down over the other side of the protuberance (see 39 in Fig. 5) on its way into the recess 32B.

Fig. 6 shows the preferred proportions of parts. The cams 24—24 are large enough to move the valve until the ball 34 is at the top of the protuberance 33; but in practice the valve will usually leave the cams 24—24 before this position of the cams has been reached.

The impetus or momentum given to the valve by the joint action of the spring pressed ball 34 and the springs 30—30 carry the valve to the extreme end of its stroke where the ball stops and latches it in the recess 32B.

A description of the means for reciprocating the rack bar 14 for the purposes described above will now be given. It will be assumed that the valve has just arrived at its extreme position in Fig. 1. Thereupon, fluid pressure (which may be air pressure, or oil or other liquid pressure, supplied from a source not shown but connected to an inlet nipple 40) flows through the nipple to a duct 41 (extending longitudinally of the housing) and thence by a duct 42 through a port 43 in the valve cylinder liner, through ducts 44 and 45 and 46, into the cylinder 11 at a point between the piston 13 and the sealed valve plug 8.

This pressure moves the rack bar toward the left. At the other end of the valve the cylinder 10 is filled with fluid (from the previous operation) and it is now exhausted, by the piston 12 out through ducts 47, 48, and 49 through a port 50 and a duct 51 to a longitudinal duct 52 (shown in dotted line in Fig. 1) and thence to an outlet nipple 53. The nipple 53 may be connected to any suitable receiver (not shown). Such receiver may be the sump for a pump supplying liquid to the nipple 40, as in well known practice.

Movement of the rack bar 14 thus effected oscillates the shaft 22 and causes the valve to be shifted to the other end of the device as described. This moves duct 49 out of registration with port 50; and moves a duct 55 into registration with a port 56, at the left end of the device; and at the right end, moves duct 44 out of registration with port 43; and moves a duct 57 into registration with a port 58. Fluid pressure now flows through nipple 40 into duct 41, through duct 54, port 56, through ducts 55, 48, and 47 to reciprocate the piston 12 in the return direction; and fluid pressure is exhausted from the piston 13, out through ducts 46, 45, 57, port 58, through duct 59 to longitudinal duct 52, to nipple 53.

Chambers, 60 and 61 are shown, between the ends of the reciprocating valve and the plugs or caps 2—2 which close the housing ends; and these chambers are connected by a duct 62; and the chambers and the duct constitute a constant-volume, sealed, displacement system. As the valve moves from the position of Fig. 1 to the other extreme position, the contents of chamber 60 are shifted through the duct 62 to the chamber 61. The contents of this system may be air or liquid such as oil.

The flow of the contents, back and forth, may be adjustably controlled by a throttle valve 63 in the line of the duct 62. By this means the rate of movement of the valve after it starts to move may be varied; and also its movement may be cushioned to avoid shock, and noise, which might be audible if the valve be brought too abruptly to rest by the ball and recess arrangement described above. It thus acts as a shock absorbing arrangement.

It will be noted that energy to move the valve is stored in springs 30; and that as the springs 30 expand in moving the valve, the springs 31 are compressed and energy stored therein for reverse movement of the valve. The springs in which energy is being stored act also as shock absorbers (obviously in both directions of reciprocation) by slowing down the velocity of the valve near the end of its stroke.

An important adjustment is provided at the spring 35. The greater its compressive force the farther must the shaft 22 and its cams rotate before the ball will "let go" and ride out of its engaged recess; so that by adjusting the tension of the spring 35 to strengthen or weaken it, the angle or throw of the oscillations of the shaft 22 may be adjusted.

The frequency of successive throws or oscillations will obviously be determined primarily by the rate at which fluid is supplied to the inlet nipple 40; and this, as is well known, may be controlled by any suitable throttle valve, in the line of the pipe leading to the nipple.

My invention is not limited to the exact details of construction illustrated and described. Changes and modifications may be made; and my invention is comprehensive of all such changes and modifications which come within the scope of the appended claims.

I claim:

1. In a fluid pressure operable servo-motor, a main housing; a pair of valve cylinders in opposite portions of the housing; a valve having opposite cylindrical end portions reciprocably supported in the valve cylinders; a pair of opposite piston chambers in the valve; a pair of pistons connected by a rack and reciprocable in the piston chambers; a power delivery shaft oscillatably supported on the housing; a pinion on the shaft meshed with the rack and oscillatable by reciprocations of the pistons and rack; mechanism including cams on the shaft to reciprocate the valve upon oscillation of the shaft; fluid pressure supply and exhaust ducts communicating with the piston chambers and controlled by reciprocations of the valve to effect reciprocation of the pistons and rack; and means to cause the valve reciprocations to occur with intermittent snap action movements.

2. In a fluid pressure operable servo-motor, a main housing; a pair of valve cylinders in opposite portions of the housing; a valve having opposite cylindrical end portions reciprocably supported in the valve cylinders; a pair of opposite piston chambers in the valve; a pair of pistons connected by a rack and reciprocable in the piston chambers; a power delivery shaft oscillatably supported on the housing; a pinion on the shaft meshed with the rack and oscillatable by reciprocations of the pistons and rack; mechanism including energy storage means in which energy is stored, by oscillations of the shaft, for reciprocating the valve; fluid pressure supply and exhaust ducts communicating with the piston chambers and controlled by reciprocations of the valve to effect reciprocation of the pistons and rack; and yieldable means to suddenly release the stored energy to cause the valve reciprocations to occur intermittently with a snap action.

3. In a fluid pressure operable servo-motor, a main housing; a pair of valve cylinders in opposite portions of the housing; a valve having opposite cylindrical end portions reciprocably supported in the valve cylinders; a pair of opposite piston chambers in the valve; a pair of pistons connected by a rack and reciprocable in the piston chambers; a power delivery shaft oscillatably supported on the housing; a pinion on the shaft meshed with the rack and oscillatable by reciprocations of the pistons and rack; mechanism including energy storage means in which energy is stored, by oscillations of the shaft, for reciprocating the valve; fluid pressure supply and exhaust ducts communicating with the piston chambers and controlled by reciprocations of the valve to effect reciprocation of the pistons and rack; and adjustable, yieldable means to release the stored energy at a preselected angle of shaft oscillation, to adjust the oscillation angle.

4. In a fluid pressure operable servo-motor, a main housing; a pair of valve cylinders in opposite portions of the housing; a valve having opposite cylindrical end portions reciprocably supported in the valve cylinders; a pair of opposite piston chambers in the valve; a pair of pistons connected by a rack and reciprocable in the piston chambers; a power delivery shaft oscillatably supported on the housing; a pinion on the shaft meshed with the rack and oscillatable by reciprocations of the pistons and rack; mechanism including energy storage means in which energy is stored, by oscillations of the shaft, for reciprocating the valve; fluid pressure supply and exhaust ducts communicating with the piston chambers and controlled by reciprocations of the valve to effect reciprocation of the pistons and rack; and yieldable means to suddenly release the stored energy to cause the valve reciprocations to occur intermittently with a snap action; means to stop the valve at the end of each reciprocation, and means to retard movement of the valve near the end of its reciprocatory movement to absorb shocks.

5. In a fluid pressure operable servo-motor, a main housing, a valve having axially spaced cylindrical portions reciprocable in axially aligned valve cylinders in the housing, the valve being provided interiorly with a pair of axially spaced work-cylinders in which are reciprocable a pair of work-pistons, an oscillatable shaft supported by the main housing, a transmission connecting the work-pistons and the shaft and the valve, to oscillate the shaft and to reciprocate the valve by reciprocations of the work-pistons and disposed between the axially spaced work-cylinders and between the axially spaced cylindrical valve portions, fluid pressure supply and exhaust ducts communicating with the work-cylinders and controlled by reciprocations of the valve to effect reciprocations of the work-pistons.

6. In a fluid pressure operable servo-motor, a main housing, a valve having axially spaced cylindrical portions reciprocable in axially aligned valve cylinders in the housing, the valve being provided interiorly with a pair of axially spaced work-cylinders in which are reciprocable a pair of work-pistons, an oscillatable shaft supported by the main housing, a transmission connecting the work-pistons and the shaft and the valve, to oscillate the shaft and to reciprocate the valve by reciprocations of the work-pistons and disposed between the axially spaced work-cylinders and between the axially spaced cylindrical valve portions, fluid pressure supply and exhaust ducts communicating with the work-cylinders and controlled by reciprocations of the valve to effect reciprocations of the work-pistons; and mechanism to cause the valve reciprocations to occur with intermittent snap action movements.

7. In a fluid pressure operable servo-motor, a main housing, a pair of valve cylinders in opposite portions of the housing, a valve having opposite cylindrical end portions reciprocably supported in the valve cylinders, a pair of opposite piston chambers in the valve, a pair of work pistons reciprocable in unison in the piston chambers, a power delivery shaft oscillatably supported on the housing; a transmission connecting the work pistons and the shaft to oscillate it upon reciprocation of the work pistons, and disposed between the work cylinders and between the valve cylinders, fluid pressure supply and exhaust ducts communicating with a work cylinders and controlled by reciprocation of the valve to effect reciprocation of the work pistons; a transmission between the shaft and valve comprising energy storage means actuated by oscillations of the shaft and releasing the stored energy to reciprocate the valve as the shaft oscillates through a predetermined angle; and adjusting means to adjust the energy storage means to adjustably predetermine the angle of oscillation.

8. In a fluid pressure operable servo-motor, a main housing; a pair of valve cylinders in opposite portions of the housing; a valve having opposite cylindrical end portions reciprocably supported in the valve cylinders; a pair of opposite piston chambers in th valve; a pair of work pistons connected by a rack and reciprocable in the piston chambers; a power delivery shaft oscillatably supported on the housing; a pinion on the shaft meshed with the rack and oscillatable by reciprocations of the pistons and rack to oscillate the shaft; a cam on the shaft oscillatable therewith; springs on opposite sides of the cam reacting upon the cam and upon the valve; the springs being alternately tensioned upon oscillation of the cam and exerting accumulating spring forces in alternate directions tending to reciprocate the valve as the shaft oscillates; adjustable yieldable means yieldably resisting reciprocation of the valve, and allowing it to reciprocate after a predetermined angle of oscillation of the shaft; fluid pressure supply and exhaust ducts communicating with the piston chambers and controlled by reciprocations of the valve to effect reciprocation of the pistons and rack.

SAMUEL R. KASSOUF.